United States Patent vor dem Esche et al.

(10) Patent No.: US 9,954,367 B2
(45) Date of Patent: Apr. 24, 2018

(54) ENERGY STORAGE SYSTEM

(71) Applicant: ENRICHMENT TECHNOLOGY COMPANY LTD., Jülich (DE)

(72) Inventors: Ing. Rainer vor dem Esche, Heinsberg (DE); Christoph Schäfer, Aachen (DE); Ing. Christoph Treppmann, Aachen (DE)

(73) Assignee: Enrichment Technology Company Ltd. (DE)

( * ) Notice: Subject to any disclaimer, the term of this patent is extended or adjusted under 35 U.S.C. 154(b) by 406 days.

(21) Appl. No.: 14/430,459

(22) PCT Filed: Aug. 30, 2013

(86) PCT No.: PCT/EP2013/067991
§ 371 (c)(1),
(2) Date: Jun. 22, 2015

(87) PCT Pub. No.: WO2014/048675
PCT Pub. Date: Apr. 3, 2014

(65) Prior Publication Data
US 2015/0318701 A1 Nov. 5, 2015

(30) Foreign Application Priority Data
Sep. 28, 2012 (EP) ..................... 12186467

(51) Int. Cl.
*H02J 3/30* (2006.01)
(52) U.S. Cl.
CPC ................ *H02J 3/30* (2013.01); *Y02E 60/16* (2013.01); *Y10T 307/313* (2015.04)
(58) Field of Classification Search
CPC ...... H02J 3/28–3/32; Y10T 307/313–307/328; Y02E 60/16
See application file for complete search history.

(56) References Cited

U.S. PATENT DOCUMENTS 7,078,880 B2 * 7/2006 Potter ....................... H02J 3/30
244/165
7,957,160 B2 * 6/2011 Babcock ............... H02M 7/493
363/131

(Continued)

FOREIGN PATENT DOCUMENTS

DE    10 2008 046 747 A1    3/2010
DE    10 2009 043 380 A1    4/2011

(Continued)

OTHER PUBLICATIONS

International Search Report for corresponding PCT/EP2013/067991 completed Jul. 31, 2014 by C. Gatzert of the EPO.

*Primary Examiner* — Thomas J Hiltunen
(74) *Attorney, Agent, or Firm* — Tarolli, Sundheim, Covell & Tummino LLP

(57) ABSTRACT

An energy storage system is provided with one or more local energy storage systems and a procedure to operate such an energy storage system. The local energy storage systems are connected to a non-local power supply grid and/or one or more local power supply grids each compromising at least one local control unit, which is intended at least for control of the respective energy storage system for localized regulating and system tasks (LRS) for the one or more respective local power supply grids. The energy storage system furthermore comprises a central control unit connected via the communication network to the respective local control units, which is intended for control (SNL) of absorbing (En) and emitting (Ep) energy of the one or more local energy storage systems to the non-local power supply grid, with the central control unit being equipped to dispose of all portions of the local storage capacities (LSKg).

29 Claims, 6 Drawing Sheets

(56) References Cited

U.S. PATENT DOCUMENTS

Figure 1:
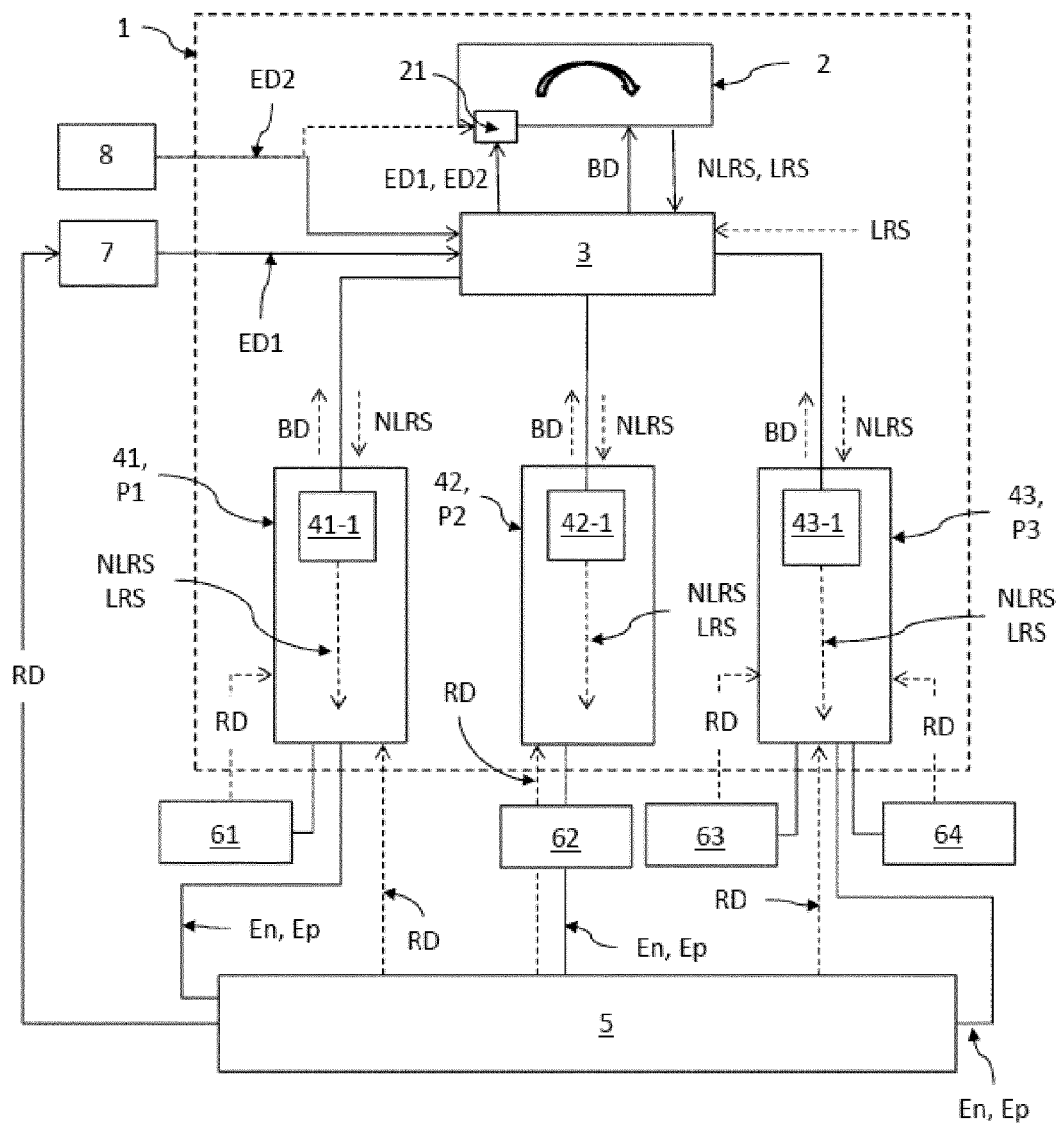

| | | | |
|---|---|---|---|
| 8,008,804 B2 | 8/2011 | Capp et al. | |
| 8,140,194 B2* | 3/2012 | Iino | H02J 3/14 700/295 |
| 8,803,363 B2* | 8/2014 | Veltri | H02J 3/30 307/47 |
| 8,946,929 B2* | 2/2015 | Singh | H02J 3/32 307/52 |
| 9,590,423 B2* | 3/2017 | Yang | H02J 3/18 |
| 9,692,234 B2* | 6/2017 | Mammoli | H02J 3/383 |
| 2004/0263116 A1 | 12/2004 | Doruk et al. | |
| 2008/0073912 A1* | 3/2008 | Fortmann | H02J 3/1885 290/44 |
| 2009/0218817 A1* | 9/2009 | Cardinal | F03D 7/028 290/44 |
| 2010/0025994 A1* | 2/2010 | Cardinal | F03D 7/0284 290/44 |
| 2012/0130556 A1 | 5/2012 | Marhoefer | |
| 2016/0172864 A1* | 6/2016 | Terazono | H02J 3/32 307/82 |
| 2016/0226249 A1* | 8/2016 | Sakuma | H02J 3/32 |

FOREIGN PATENT DOCUMENTS

| | | |
|---|---|---|
| EP | 2 398 125 A2 | 12/2011 |
| WO | WO 2009/052446 A2 | 4/2009 |
| WO | WO 2012/036799 A1 | 3/2012 |

* cited by examiner

ENERGY STORAGE SYSTEM

RELATED APPLICATIONS

The present invention is a U.S. National Stage under 35 USC 371 patent application, claiming priority to Serial No. PCT/EP2013/067991, filed on 30 Aug. 2013; which claims priority from European Patent Application No. 12186467.2, filed 28 Sep. 2012, the entirety of both of which are incorporated herein by reference.

FIELD OF THE INVENTION

The invention refers to an energy storage system with one or more local energy storage systems and a procedure to operate such energy storage system.

BACKGROUND OF THE INVENTION

The energy for operating a power supply grid is supplied by various and different types of power stations. Herein, most of the power stations, such as nuclear power stations, coal-fired power stations, gas-fired power stations, wind turbines, biogas plants, or solar power plants, are nothing but energy generators for feeding energy into the non-local power supply grid. For example, non-local power supply grids are distribution networks and transmission networks, such as they are operated in Germany by Amprion, 50 Hertz, Tennet, and TransnetEnBW. These transmission networks are a part of the wide area synchronous grid in Europe. In their capacity as mere energy generators, the power stations mentioned above cannot absorb any extra energy from the grid and store it in case of need. In contrast, energy storage systems can be used to collect energy from and release it to a power supply grid. For example, energy storage systems are central energy storage systems, such as pumped storage power stations, or decentralized energy storage systems, such as battery storage devices or flywheel energy storage units. Pumped storage power stations are energy storage systems that are largely not subject to changes in weather and, as a general rule, are therefore always available. Usually, central energy storage systems are designed for a large capacity. Due to the available capacity, such systems are adapted to provide reserve energy for the non-local power supply grid in order to take appropriate effect in the non-local power supply grid. Depending on their overall size, pumped storage power stations may have a capacity of several 100 MW and more wherein, however, the generators are, in most cases, designed to produce electric current under full load and can therefore utilize the full capacity of the pumped storage power station at an appropriate efficiency and in a timely manner. This operating method is not adapted to stabilize or improve the quality of a small local power supply system having a demand for electricity that is rather negligible as compared with the capacity of the pumped storage power station. Centrally used battery storage devices are currently under construction with the objective to put into practice a pilot operating method for grid-stabilizing (non-localized) tasks (reserve energy). However, the devices that have been planned so far do not fulfill any localized tasks. However, because of their ratio between performance, capacity and aging, battery accumulators are not very suitable for applications with several load cycles per day.

Local energy storages are generally optimized for stabilization of the local power demand and not designed or qualified for delivery of control energy to support the non-local power supply grid. Connection of the local accumulators into a facility that has a non-local as well as a local effect does not take place yet.

Therefore, it would be desirable to provide an energy storage system that at the same time permits the improvement of local power quality and supply safety for non-local power supply grid and thus can be operated as an energy storage system with sufficient effect for both purposes.

SUMMARY OF THE INVENTION

It is an object of this invention to provide an energy storage system that permits concurrent improvement of local power quality and supply safety for non-local power supply grids.

This object is solved by an energy storage system comprising one or more local energy storage systems with a respective local storage capacity and local output, suitable for absorbing and emitting energy from and to connected power supply grids, with the one or more local energy storage systems being connected to a non-local power supply grid and/or one or more local power supply grids respectively and at least comprising one local control unit that is intended at least to control the respective energy storage system for localized regulating and system tasks for the one or more respective local power supply grids and the energy storage system further comprising a central control unit connected via a communication network to the respective local control units that is intended for control of absorbing and emitting energy from the one or more local energy storage systems to the non-local power supply grid, with the central control unit for this being equipped with disposing of all portions of the local storage capacities and the local output of the one or more energy storage systems for non-localized regulating and system tasks in the non-local power supply grid that the respective local control units have submitted as being not needed for the localized regulating and system tasks to the central control unit via the communication network.

With this invention, the energy storage systems placed locally in the energy storage system can improve the local power quality and implement supply safety in a non-local power supply grid or power network. The possibility of positive and negative energy provision (energy infeed and absorption of energy from the power supply grid) permits a flexible reaction to the present power supply grid conditions. The local energy storage system (systems) permit efficient and concurrent meeting of needs in local and non-local power supply grids with the same energy storage system through the integration of local control units with a central control unit. The energy storage system according to the invention can also increase the technical and economic usability of regenerative energy sources, since the fluctuating local energy generation via the local energy storage systems can be buffered directly or over time in local and non-local power supply grids and provided adjusted to the respective power supply grid needs.

The use of one or more local energy storage systems as local interim storage with the respective connections to local and/or non-local power supply grids can improve the local power quality through localized regulating and system tasks on site while at the same time providing the non-local power supply grid with positive energy (infeed into the power supply grid) or negative energy (absorbing energy from the power supply grid) through the non-localized-bound regulating and system tasks for power supply grid adjustment. The energy storage systems can either be directly connected to a non-local power supply grid and one or more local power supply grids, or the energy storage systems can be connected indirectly to a non-local power supply grid via a connected local power supply grid, if the local power supply grid is part of the non-local power supply grid (connected to the non-local power supply grid). Localized regulating and system tasks include ensuring the required local power voltage, the reactive power compensation by control of amplitude and phase position of the voltage signal, provision of a local output reserve for possibly activating larger power consumers or activation current peaks, and storage of local excess energy amounts. Non-localized regulating and system tasks include the provision of primary or secondary regulating output. The regulating output (also reserve output) ensures supply of power customers with just the required electrical output at unforeseen events in the power supply grid. For this, output adjustments of adjustable power plants can be performed on short notice, and power plants that start up quickly or energy storages such as the energy storage system according to the invention can be used. The primary regulating output is used to compensate for imbalances between the physical output offer and output demand with the target of restoring a stable line frequency. The secondary regulating output is to recover the balance between the physical power offer and power demand after a difference; in contrast to the primary regulation, only the situation in the respective regulation zone including the power exchange with outer regulation zones is viewed here. Further non-localized regulating and system tasks include the provision of energy storage systems to support a black start, the general storage of output peaks, and reactive power compensation for increase of the transmission output in a non-local power supply grid. Further regulating and system tasks for local and/or non-local power supply grid include the provision of redundancy (fail safety) at power supply in combination with the already-present energy suppliers and reactive power management.

The non-local power supply grid describes a power supply grid that covers very large areas over-regionally, and in which the non-localized regulating and system tasks are performed. Non-local power supply grids include transmission networks (public power supply grid). In Germany, the public power supply grid is, for example, composed of four transmission networks which are operated by the network operators Amprion, 50 Hertz, Tennet, and TransnetEnBW. Together, the four transmission networks form the Netzregelverbund for Germany (cooperation in terms of control power). In other countries, appropriate transmission networks are operated by other network operators. In the transmission networks, the frequency of the power supply grid is maintained at a stable value (frequency control). The superordinate European wide area synchronous grid of the respective transmission networks in the individual states can also be viewed as a non-local power supply grid, though only the standards for control energy are specified for it so far. The non-localized regulating and system tasks are performed in the respective transmission networks. Local power supply grids in the sense of the invention are the power supply systems in which the localized regulating and system tasks described above are performed. Local power supply systems are usually strongly spatially limited, e.g. an operating-internal power supply system on an operating facility or a network within a building or building complex.

The energy storage system according to the invention can be any suitable energy storage system that is able to perform not only the localized regulating and system tasks but also non-localized regulating and system tasks in non-local networks, e.g. via the provision of primary or secondary regulating output based on its storage properties and storage parameters. Suitable energy storage systems include local (non-central) compressed air accumulators or hydrogen accumulators in combination with fuel cells, battery systems or kinematic energy storages such as flywheel energy accumulators. In one embodiment, the energy storage system comprises one or more flywheel energy accumulators to absorb energy from the connected power supply grids and to emit energy to the connected power supply grids. Such energy storage systems can be modularly made up of several flywheel energy accumulators or storage modules with several flywheel energy accumulators each. The simple modular setup easily permits adjustment of the storage capacity and output of the energy storage system with flywheel energy accumulators to the demand and to clearly expand it if necessary. Thus, the corresponding design of the energy storage system permits the required regulating output e.g. for the transmission network. In case of a modular setup with several storage modules in a local energy storage system, each module has its own connection point with the connected power supply grids and is connected via suitable components within the local energy storage system. Flywheel energy accumulators have the benefit that they can provide the energy amounts to be absorbed or emitted very variably and precisely for the consumers and that they store this energy in the form of mechanical energy. Thus, flywheel energy accumulators are a much lower danger potential in case of fire than, e.g., larger collections of batteries, combined into a battery energy storage system or hydrogen accumulators with hydrogen tanks and flammable hydrogen as a danger potential. In compressed air accumulator facilities, non-flammable gases may be used for energy storage, but the compressed air tanks have an explosion potential due to the high pressure in the compressed air tanks. If used as energy storage systems, flywheel energy storage units therefore represent an energy provision technology that is environmentally safer than other storage technologies and are well suited for any number of load cycles per day desired. Energy provision is referred to as negative energy provision when energy is collected from the power supply grid and is stored in the flywheel energy storage unit in the form of mechanical rotational energy. Accordingly, positive energy provision is when the energy stored in the flywheel energy accumulator in the form of mechanical rotation energy is fed into the power supply grid by braking the flywheels (or rotors). The ability of flywheel accumulators to provide energy within a few milliseconds is just as beneficial here as their ability to provide the specified output across a period of several minutes. The connection of the local energy storage system to the non-local power supply grid and/or the respective one or more local power supply grids can be equipped suitably by the specialist, with the connection being designed to supply the power supply grids (one or more non-local and/or local ones) with energy independently from each other through the energy storage system or to absorb energy from the power supply grids.

The local control unit designates a component in the energy storage system that controls the energy storage system, i.e., that sets the desired operating conditions and operating parameters and that controls the energy storage system according to an operating plan that contains the desired operating conditions as a function of time. Furthermore the local control units are able to react accordingly to changing situations in the local and non-local power supply grid according to the corresponding regulating and system tasks. For this, the power quality of the local power supply grid can be increased or maintained by energy emitting or energy absorption, or the power quality can be improved again after an interference in the local power supply grid and/or regulating output can be provided to the non-local power supply grid. The localized regulating and system tasks can be submitted by external systems via the communication network to the respective local energy storage systems. External systems are, e.g., control systems of the operators of the local power supply grid, local measuring points or the central control unit. The submitted instructions correspond to the localized regulating and system tasks for the respective local energy accumulator unit. In addition to the regulating and system tasks in the local power supply grid, the local control unit can receive commands, instructions, etc. regarding the non-local power supply grid from the central control unit and execute these commands or instructions in parallel to the localized regulating and system tasks. The central control unit controls, e.g., the provision of control energy for the non-local power supply grid and at least disposes of the free capacities and outputs not required for localized regulating and system tasks (free non-local capacities, free non-local outputs) of the local energy storage systems depending on demand. The central control unit can comprise one or more interfaces with external systems for this to receive external data for a superordinate control of the energy storage system. Such an external system may, e.g., be the superordinate control of a mains network that passes on the regulating output demand to the subsystems, such as the energy storage system according to the invention, to provide the control energy. Further external systems may be the output supporting network or a power exchange that is accordingly beneficial due to the infeeds or energy tapping during specific operating times. These external data can be submitted to the central control unit directly or via the communication network. Further external data include, e.g., the reactive power demand, peak load compensation or a local storage demand currently needed.

The local control unit of the energy storage system, or for several energy storage systems in the energy storage system the local control units of the energy storage systems, are connected to the central control unit for operation of the energy storage system via the communication network. The control of the respective energy storage system in the energy storage system according to the invention is performed by the local control unit on site based on the present regulating and system tasks, with the central control unit controlling all energy storage systems of the energy storage system and accordingly submitting instructions to the respective local control units in the form of regulating and system tasks for their execution on site. These submitted regulating and system tasks are at least the non-localized regulating and system tasks specified by the central control unit for the respective local energy storage systems, since the general overview of the required regulation for the non-local power supply grid is available to the central control unit. The local energy storage systems can adjust the respective execution of the specified non-localized regulating and system tasks locally suitably for demand, e.g. based on the data measured on site in the non-local power supply grid. For the execution of the non-localized regulating and system tasks, the local energy storage system does not even have to be directly connected to the non-local power supply grid. It is sufficient that the local energy storage system is indirectly connected to the non-local power supply grid via a local power supply grid that is part of the non-local power supply grid. In this case, the infeed or removal of energy into/from the local power supply grid equally applies to the non-local power supply grid. The localized regulating and system tasks for the respective local energy storage systems for execution in the connected local power supply grids can be submitted to the local energy storage facilities independently of the central control unit and/or in addition to the non-localized regulating and system tasks by the central control unit as well. The localized regulating and system tasks submitted by the central control unit to the local energy storage systems may consider the tasks of the energy storage system wholly or specifically for regional purposes. For example, changed outer influences on the energy storage system level may cause a demand for adjustment of the local output reserve or storage of local excess energy amounts of one or more local energy storage systems as compared to the previous localized regulating and system tasks. The central control unit would generate and submit new localized regulating and system tasks accordingly for these local energy storage systems, which are then performed by the respective local control units on site for the individual energy storage systems. For example, an expected higher wind speed requires interim storage of a larger amount of wind power from a wind turbine generator. The respective local energy storage systems near the wind turbine generator do not have sufficient storage capacities free for this, since the local energy storage systems are already charged too much. In this case, the central control unit controls energy transfers to other energy storage systems that are not fully charged to provide enough storage capacity on site to store the expected wind energy amount in the local energy storage systems on site.

For this, the central control unit and the respective local control units must be connected via a communication network. The communication network can be designed suitably by the specialist in the scope of the present invention. For example, the communication network is a radio-based network or mobile phone network, a high-availability connection or a network according to IECG. Alternatively, the communication network may also be a wire-bound phone network or a computer network (e.g. the Internet). In one embodiment, the communication network comprises more than one different types of networks (sub-communication networks) and corresponding interfaces to the central control unit and the local energy storage system or systems and/or the local control unit or units. The presence of more than one sub-communication networks in the communication network clearly reduces the failure risk for the entire communication network, since alternative network types will be available for unimpaired communication between the central control unit and the local control units in case of failure of one network type. Preferably, the communication network comprises wire, radio and power-bound sub-communication networks.

In one embodiment, the energy storage system comprises more than one local energy accumulators that can be placed in spatially different positions and are connected to respective different local power supply grids with different tasks. The spatially different positions permit distribution of the energy storage systems across wider areas or regions, so that non-local provision of energy to the non-local power supply grids can also take place locally. In contrast to this, the energy, which, e.g., is provided by a large pump accumulator, would have to be transported across long distances in the non-local power supply grid to the consumer. For a spatially distributed setup of the local energy storage system in the energy storage system according to the invention, at least part of the required energy can be fed in to the non-local power supply grid close to the consumer.

In one embodiment, the local energy storage system comprises one or more measuring units to measure one or more relevant bits of data in the respective connected power supply grid. The control units are intended to control the local energy storage system for the respective connected power supply grid based on the measured relevant data. The measuring units may be integrated in the local power supply grid or placed in one or more locations at the local power supply grid. The measuring units may also be placed at the connection point between the local energy storage system and the local power supply grid. If the local power supply grid is connected to the non-local power supply grid, the relevant data of the non-local power supply grid are measured by it as well. However, if the local power supply grid is connected separately, the measuring units are integrated in the non-local power supply grid or placed at one or more points at the non-local power supply grid. The measuring units can also be placed at the connection point between the local energy storage system and non-local power supply grid. Measuring units within the scope of the present invention are, for example, measuring probes for measuring the line frequency and the line voltage as an example of relevant data for the connected local power supply grid. Other measured values include the voltage curve as a function of time, phase angle, star point, frequency, current, etc. The specialist can select suitable measuring units or measuring probes in the scope of this invention and place them in suitable positions. If, e.g., the desired line frequency is 50 Hz and if the measuring units find that the line frequency drops, the local control unit will automatically feed in energy into the local power supply grid based on the currently measured line frequency (as measured relevant data) and a reaction sequence stored in the local control unit (localized regulating and system task), until the line frequency has returned to the desired value. Further examples include measurement of the phase angle in the local power supply grid to provide the corresponding reactive power compensation or voltage measurement in case of too much or too low load consumption in the local power supply grid to maintain voltage quality. For other regulating and system tasks, the corresponding other reaction sequences are stored in the local control unit.

In another embodiment, the local energy storage system comprises a control unit to which the one or more local power supply grids and non-local power supply grid are connected, with the control unit being equipped for control of an energy flow between the connected power supply grids and the energy storage system. If the local and non-local power supply grids were only connected to the connection point of the energy storage system, the energy fed in by the local energy storage system would only be fed into the power supply grid with the higher energy demand. This would no longer permit targeted control according to a task distribution. Current energy storage systems are typically connected to a single power supply grid via a switch. The above control of the energy flow would be dispensed with and the switch would only need to be opened if the power supply grid fails. In the present invention, however, the control unit is equipped so that the other connected power supply grid continue to be supplied with energy as desired or that energy can be absorbed from them after disconnection of one power supply grid, since the local energy storage system in the scope of the present invention simultaneously needs to supply more than one separate power supply grids. The control unit controls the energy flow to the connected power supply grids in the manner intended for in the local control. In a preferred embodiment, the control unit is also intended to disconnect one or more of the connected power supply grids from the local energy storage system in case of demand. In the event of a failure of one of the connected power supply grids, the regulating unit disconnects this power supply grid from the energy storage system at once, i.e., within a few milliseconds, to ensure that the energy storage system continues to be operable for the other power supply grids. Otherwise, a short circuit or overload situation may occur.

In another embodiment, the central control unit receives operating data from the local control units via the communication network and then submits at least non-localized regulating and system tasks for emitting energy to the non-local power supply grid and/or absorbing energy from the non-local power supply grid via the communication network to the local energy storage system or systems based on these operating data. The operating data of the local energy accumulator unit indicate, e.g., which free capacity and free output (capacity and output that are not needed for the localized regulating and system tasks) the local energy storage system can provide for non-localized tasks. The time cycle usually is 1 Hertz or less. In this respect, the central control unit may plan and charge the non-localized regulating and system tasks with this submitted free capacity and free outputs. In an energy storage system with a variety of local energy storage systems with a variety of free capacities and free outputs that may differ strongly for the individual energy storage systems depending on overall capacity and overall output of the individual energy storage system and its tasks for the local power supply unit, the central control unit may very flexibly and quickly initiate capacities and outputs for infeed in the non-local power supply grid or for energy tapping from the non-local power supply grid via the corresponding instructions (submitted non-localized regulating and system tasks) to the local control units of the respective energy storage systems. The central control unit may even assign locally different tasks to the local control units. For example, the central control unit may cause the local control units of the energy storage systems that are also placed near a larger consumer and the positions of which are known to the central control unit, to feed in (emit) energy into the non-local power supply grid via the correspondingly submitted regulating and system tasks to support the non-local power supply grid near this consumer. In the same non-local power supply grid (or another non-local power supply grid), the central control unit may submit regulating and system tasks to tap energy from the non-local power supply grid to local control units of other energy storage systems that are geographically far distant from the above energy storage systems. Thus, the central control unit may assign the corresponding non-localized regulating and system tasks to the respective local control units via corresponding individually adjusted submissions flexibly adjusted according to the regional situation at a variety of energy storage systems geographically placed in different positions. The central control unit can also submit new or changed localized regulating and system tasks based on the operating data to the local energy storage systems, however.

In another embodiment, the local energy storage system comprises a task storage for storage of the localized and non-localized regulating and system tasks, which is at least configured and/or updated by the central control unit regarding the non-localized regulating or system tasks in the non-local power supply grid and which is accessed by the local control unit for control of the local energy accumulator according to the localized and non-localized regulating or system tasks. The term "configure" designates the first storage of regulating and storage tasks in the task storage. The term "update" designates the addition of further regulating and system tasks at a later time or the change of already-stored regulating and system tasks. The configuration and updating may also refer to localized regulating and system tasks that may also be submitted by the central control unit. The task storage may be a suitable data accumulator in the energy storage system. It may be designed as part of the local control unit or as a separate accumulator. In both cases, the local control unit is connected to the task storage so that it can access the task storage at any time, read the regulating and system tasks stored in it and control the local energy storage system accordingly. The specialist can design the circuit-technical access of the local control unit to the task storage and the accumulator modules to be controlled in the energy storage system suitably in the scope of the present invention. The instructions on the regulating and system tasks may be stored in the task storage e.g. as a provision "Storage from the non-local power supply grid xx kWh on y.day from zz hours onwards". In a further example, the instruction in the task memory might be: "Feeding xx kW per hour into the local power supply grid beginning at zz hours today". The specific data format of the instructions can be suitably chosen by the specialist in the scope of the present invention. These instructions (or tasks) in the task storage may refer, e.g., to a regulating output or voltage or current stabilization. The instructions (or tasks) can be stored without time relation. An instruction (or task) without time relation may be, e.g., "deliver the corresponding regulating output depending on a mains frequency deviation of 50 Hz according to a specified curve".

In another embodiment, the local control unit is equipped to give the localized regulating and system tasks for control of the respective energy storage system precedence over the non-localized regulating and system tasks. Since the energy storage system according to the invention usually has a variety of local energy storage systems, the central control unit can usually make use of a sufficient number of energy storage systems and thus a sufficient free capacity without having to neglect or even ignore the localized regulating and system tasks. E.g. 20 facilities à 1.6 MWh in the system network correspond to 32 MWh. E.g. 1 MWh are locally reserved. This leads to an available capacity for non-local tasks of 12 MWh. Concurrent requirements for the provision of further output would have to be considered and poss. observed additionally. At only a single energy storage facility in the energy storage system, the free capacity or output is either sufficient to meet the non-localized regulating and system tasks in the normal case, or the additional capacity that is reserved for localized regulating and system tasks would be insufficient as a possible reserve to solve the mains problems in exceptions. Therefore, the precedence for localized regulating and system tasks is beneficial even in a single local energy storage facility in the energy storage system according to the invention In another embodiment, the local energy storage system is intended for exclusive performance of the localized regulating and system tasks for the one or more respective local power supply grid in the task storage in case of failure of the communication network and/or the central control unit. The preference of localized regulating and system tasks at impaired communication with the central control unit is beneficial since failure of the communication with the central control unit will prevent the respective local control units from receiving any more feedback on the updated task storage or the current demand or condition of the non-local power supply grid. Where the local control units simply process the present tasks without feedback of the central control unit, this could even lead to failure of the power supply grid due to overload in special conditions of the non-local power supply grid. Therefore it is beneficial to perform only the localized regulating and system tasks to which the local energy storage system is obliged in case of impaired communication paths with the central control unit or even failure of the central control unit, while suitability of these local tasks can be directly locally monitored via dedicated measuring units of the energy storage system if necessary. The local tasks may be changed on site via a change in the task storage. For the non-local power supply grid, this cannot be performed accordingly, since the needs of the non-local power supply grid also depend on actions of other power plants, consumer or accumulator systems that are only included in the energy storage system via the central control unit.

In another embodiment, the central control unit is intended for determining which of the local energy storage systems are ready for black start support and that black start support takes precedence over the localized regulating and system tasks for the one or more respective connected local power supply grid. A black start is generally the startup of an energy supplier, e.g., a power plant or energy storage, after a power failure, if this is done independently of the power supply grid. Black start capacity means the ability of such energy suppliers to start up independently of the power supply grid from the deactivated condition or to emit energy from an energy storage. This is particularly important at an area-comprehensive failure of the non-local power supply grid, to take the non-local power supply grid back into operation. The energy of black-start-capable power plants or energy storage systems can then be used to start up non-black-start-capable power plants or energy storage systems. E.g. heat cogeneration plants require a high amount of electrical energy before they can provide electrical or thermal output themselves. If a coal-fired or nuclear power plant is provided with one or more black-start-capable local energy storage systems according to the invention in the scope of the energy storage system according to the invention with sufficient output, the overall system may also achieve black start capacity here.

In another embodiment, the central control unit comprises one or more interfaces with external systems to receive external data for a superordinate control of the energy storage system and is intended to determine one or a number of local energy storage systems based on these external data that are intended for non-localized regulating or system tasks in the non-local power supply grid preferably as compared to other local energy storage systems and that form a network for the non-local power supply grid. A regulating network here is the combination of several energy storage systems for shared reaction to needs in the non-local power supply grid. The external systems are, e.g., a mains network control to report a regulating output demand, a required output support, a reactive power demand, a required peak load compensation or a required storage demand. The external data can also comprise localized regulating and system tasks, such as maintenance of the power voltage in local power supply grid, peak load compensation in these local power supply grid, reactive power demand for the local power supply grid or a local energy storage demand. In one embodiment, the external data for localized regulating and system tasks are also saved and processed by the central control unit and forwarded to the respective local energy accumulator units via the communication network. For storage of external data, the central control unit either has a data storage or is connected to such data storage and has access to it. This data storage can be any suitable data storage, e.g. a server or database, preferably connected to the communication network through the corresponding data lines and components. Through these interfaces, the central control unit receives current demand reports so that the task storage in the local control units can always be kept up to date and the local control units can react up to date at any time to the needs in the non-local and the local power supply grid with emission or absorption of energy to or from the local energy accumulators.

In another embodiment, the central control unit is intended to determine individual or a number of local energy storage systems based on local or regional influence data that form a regional network of the specific energy storage systems and to submit their additional or changed preferential localized regulating and system tasks as regional regulating and system tasks. Local or regional influence data means, e.g., environmental data that influence the energy to be fed into a power supply grid, such as wind speed, sun intensity and sunshine duration or temperature; based on such influence data, the energy amounts that are produced, e.g. in energy systems for use of regenerative energies as in wind turbine generators or solar power plants, can also be evaluated on short notice. If the local environmental data (influence data) change as compared to a former forecast, e.g. much more or much less energy may in fact be fed into the power supply grid from such energy systems. Accordingly, regional networks according to the invention may also store any excess energy amounts and feed them into the power supply grid at a later time. If a local power supply grid is fed, e.g., from such energy systems as wind turbine generators or solar power plants and if it is foreseeable from the influence data that these energy systems will provide less energy than planned, the respective local energy storage systems connected to the local power supply grid may provide missing energy to the local power supply grid. A regional network here is the connection of several energy storage systems for shared reaction to needs in one or more local power supply grid. Energies for specific localized regulating and system tasks via the non-local power supply grid may also be moved to energy storage systems of this regional network in a different geographical position. If, e.g., a local energy storage system requires an energy infeed for its connected locals power supply grid from its energy accumulator modules into this local power supply grid and if this energy storage system does not have the required energy for this stored in its storage modules, it may also receive this energy from any other local energy storage system placed in a different location without this other local energy storage system needing to be connected to the same local power supply grid as the energy storage system with the too-low available energy. The local energy storage systems are all connected to each other within the energy storage system via the non-local power supply grid. Preferably, the local energy storage systems that are intended for short-term accumulation (storage) of energy and already too fully charged transfer power to the energy storage system needing power. This way, energy storage management can be performed within the energy storage system according to the invention. Only when the non-local power supply grid fails would this no longer be the case. In this case, all local energy storage systems affected by this failure would be autonomous energy storage systems to supply the local power supply grid. The energy transfer from one local energy storage system to another local energy storage system can be desired specifically when the emitting local energy storage system is intended to absorb energy soon from a local power supply grid, e.g. for a wind power plant or soar power plant, in the scope of its localized regulating and system tasks.

In another embodiment, the control units of the energy storage systems of the regulating network and/or the regional network are designed to communicate directly with each other through the communication network for execution of the non-localized regulating or system tasks and/or regional regulating and system tasks without including the central control unit. This relieves the central control unit and accelerates regulation in the network. The local energy storage systems combined in a regulating network may be other facilities than the local energy storage systems combined in a regional network. There also may be the case that the local energy storage systems in the regulating network are the same systems as in a regional network.

In another embodiment, the central control unit transfers the task of control of the regulating network and/or the regional network at least temporarily to a local control unit determined by the central control unit in the regulating network and/or in the regional network. This transfer is saved, e.g., in the task storage of the specific energy storage system and forwarded by the respective local control unit as leading control unit to the other local control units of the other local energy storage systems in the network via the communication network. This defines the total control task so that all local energy storage systems are in a relationship to each other that is defined for the regulating and system tasks and thus are able to effectively work in the network. In a preferred embodiment, the central control unit submits a hierarchy of the local control units in the regulating network and/or in the regional network together with the transfer of the control task, with the local control unit following in the hierarchy being intended for controlling the regulating network and/or the regional network if the control unit charged with control or the corresponding local energy storage system fails. Thus, the network has a defined task distribution even if the leading local control unit fails, and the corresponding next local control unit takes over control in the network. This hierarchy is stored, e.g., also in the task storages of the local control units of the local energy storage systems of the respective network. When the leading local control unit or the entire energy storage system fails, the other local control units are designed to recognize the next local control unit in the hierarchy as leading control unit and to take instructions from this control unit accordingly. This control change may be confirmed by the local control units, e.g., by mutual automatically generated notifications sent through the communication network.

In another embodiment, the local control unit is designed to periodically review the present connection with the central control unit or further local control units integrated in the network via the communication network. In a digital handshake, the presence of the communication connection is reviewed. For this, the local control unit sends a data package to the central control unit and receives a corresponding data package back in reaction. The sending and the received return is logged and stored by the local control unit, e.g. on a server or in a database. Alternatively, the above digital handshake may also be initiated by the respective central control unit. In a preferred embodiment, the digital handshake is performed directly via the communication network between the local control units as well. This way, it is at all times determined if communication between the central control unit and the local control units is possible; in this respect, an interrupted communication cannot be misunderstood as lack of update of the non-localized regulating and system tasks with a corresponding continuation of the last regulating and system task. If the communication is interrupted, another regulating and system task may be necessary without the possibility of informing the local control units of this. Therefore, the local control unit is limited to localized regulating and system tasks when communication is interrupted.

In another embodiment, the local control unit is designed to restore this connection via an alternative sub-communication network in the communication network if the connection with the central control unit is interrupted. The redundancy in the communication network permits receipt of a possibly important update of the non-localized regulating and system tasks via the alternative sub-communication network. Possible sub-communication networks include, e.g., radio-based, wire-bound or power-bound communication networks such as the mobile phone network, Internet, the regular phone network or the power supply grid, where a data connection is established via the power cables in the power supply grid.

The invention furthermore relates to a procedure for operation of an energy storage system according to the present invention, comprising one or more local energy storage systems with a respective local storage capacity and local output, which are suitable for absorbing and emitting energy from/to connected power supply grids, comprising the steps Control of the respective local energy storage system for localized regulating and system tasks in one or more local power supply grids connected to the local energy storage system by a local control unit in the scope of the capacity and outputs of the energy storage system intended for the one or more local power supply grids Submission of the capacities and outputs of the local energy storage system not required for the localized regulating and system tasks by the local control unit via a connected communication network to a central control unit also connected to the communication network, and Control of the respective local energy storage system for absorbing and emitting energy for non-localized regulating and system tasks into a non-local power supply grid also connected to the local energy storage system via the central control unit via the communication network in the scope of the portions of all capacities and outputs of the energy storage system not needed for the localized regulating and system tasks required and submitted to the central control unit The capacities and outputs required and not required for the localized regulating and system tasks can be submitted to the central control unit in the scope of the operating data. In one embodiment, control of the local energy storage system by the central control unit does not take place directly, but through the non-localized regulating and system tasks submitted through the communication network and saved in a task storage, which are read by the respective local control units and executed where possible. In another embodiment, the central control unit may also directly submit instructions for non-localized regulating and system tasks to the respective local control units, which are executed by the respective local control unit (where the capacities and outputs permit).

In one embodiment, the procedure comprises the following steps:

Measurement of one or more relevant data in the respective power supply grid connected to the local energy storage system by one or more measuring units of the local energy storage system and Control of the local energy storage system in this power supply grid by the control unit based on the measured relevant data.

In another embodiment, the procedure comprises the further steps:

Configuration and/or updating of at least the non-localized regulating or system tasks for the non-local power supply grid in a task storage of the local energy storage system, which additionally comprises the localized regulating and system tasks, Access of the local control unit to the task storage for control of the local energy accumulator, Preferential control of the energy storage system for localized regulating and system tasks by the local control unit according to the task storage in regular operation and Exclusive execution of the localized regulating and system tasks for the one or more respective local power supply gridat failure of the communication network and/or central control unit.

The term regular operation means the operation of the local energy storage system with a non-local power supply grid that is mostly not subject to fault.

In another embodiment, the procedure comprises the further steps

Receiving external data for a superordinate control of the energy storage system by the central control unit by one or more interfaces for external systems for a superordinate control and Forming a regulating network for the non-local power supply grid by determining individual or a number of local energy storage systems based on these external data, preferably from other energy storage systems for the preferred non-localized regulating or system tasks in the non-local power supply grid The determination of individual local energy storage systems for a regulating network may be done, e.g., based on their respective operating data and the present demand in the non-local power supply grid. Some local energy storage systems may fail because of their current or general operating data for a regulating network, e.g. too-low capacity or lack of black start capacity. Preferred non-localized regulating and system tasks are, e.g., the provision of higher amounts of energy for the non-local power supply grid in a limited region in the non-local power supply grid due to a larger conductor connecting to the non-local power supply grid. Another example of preferential non-localized regulating and system tasks would be a regulating network for black start support.

In another embodiment, the procedure comprises the further steps

Forming a regional network by determining individual or a number of local energy storage systems by the central control unit based on local or regional influence data and Submission of additional or changed preferential local or regional regulating tasks to the specific energy storage systems in the regional network The determination of individual local energy storage systems for a regional network may take place, e.g. due to its respective operating data and the present demand in one or more local power grids. Some local energy storage systems may fail due to their current or general operating data for a regional network, e.g. due to too-low capacity or detrimental geographic position. The additional or changed preferential regulating and system tasks can be saved in the working memory so that these tasks are attached to the previously saved tasks and accordingly indexed preferentially, e.g. by setting a corresponding mark in the data records. The task history is retained for protocol purposes. Alternatively, subordinate tasks can be overwritten, since their application is dispensed with the preference of other tasks. Storage space can be saved here.

In another embodiment, the procedure comprises the further step

Determination of the local energy storage systems by the central control unit that are ready for black start support, with the black start support taking precedence over the localized regulating and system tasks for the one or more respective connected local power supply grids.

In another embodiment, the procedure comprises the further steps

Forming a regulating network and/or a regional network from the energy storage systems determined by the central control unit, with the control units of the energy storage facilities of the regulating network and/or the regional network being designed to communicate with the central control unit as well as possibly directly with each other via the communication network to meet non-local regulating and system tasks and/or regional regulating and system tasks and At least temporarily transfer of the task of controlling the regulating network and/or the regional network by the central control unit to a local control unit previously determined by the central control unit in the regulating network and/or in the regional network.

In another embodiment, the procedure comprises the further steps

Submission of a hierarchy of local control units in the regulating network and/or in the regional network together with transfer of the task of control by the central control unit to the local control units of the regulating network and/or the regional network and Assumption of the control of the regulating network and/or the regional network by the local control unit following in the hierarchy at failure of the control unit charged with control or the corresponding local energy storage system.

SHORT DESCRIPTION OF THE FIGURES

These and other aspects of the invention are reflected in detail in the figures as follows.

Figure 2:
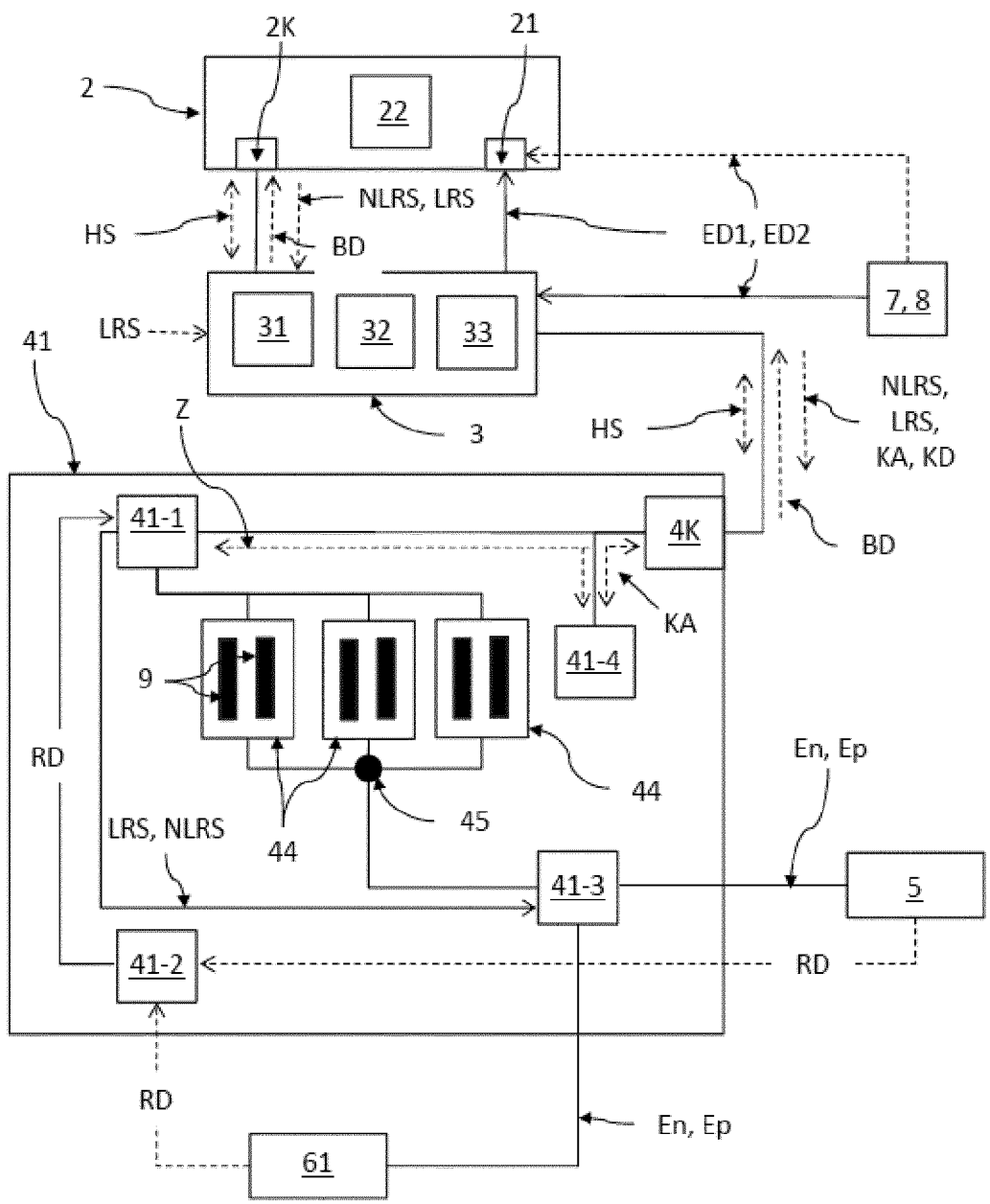
Figure 3:
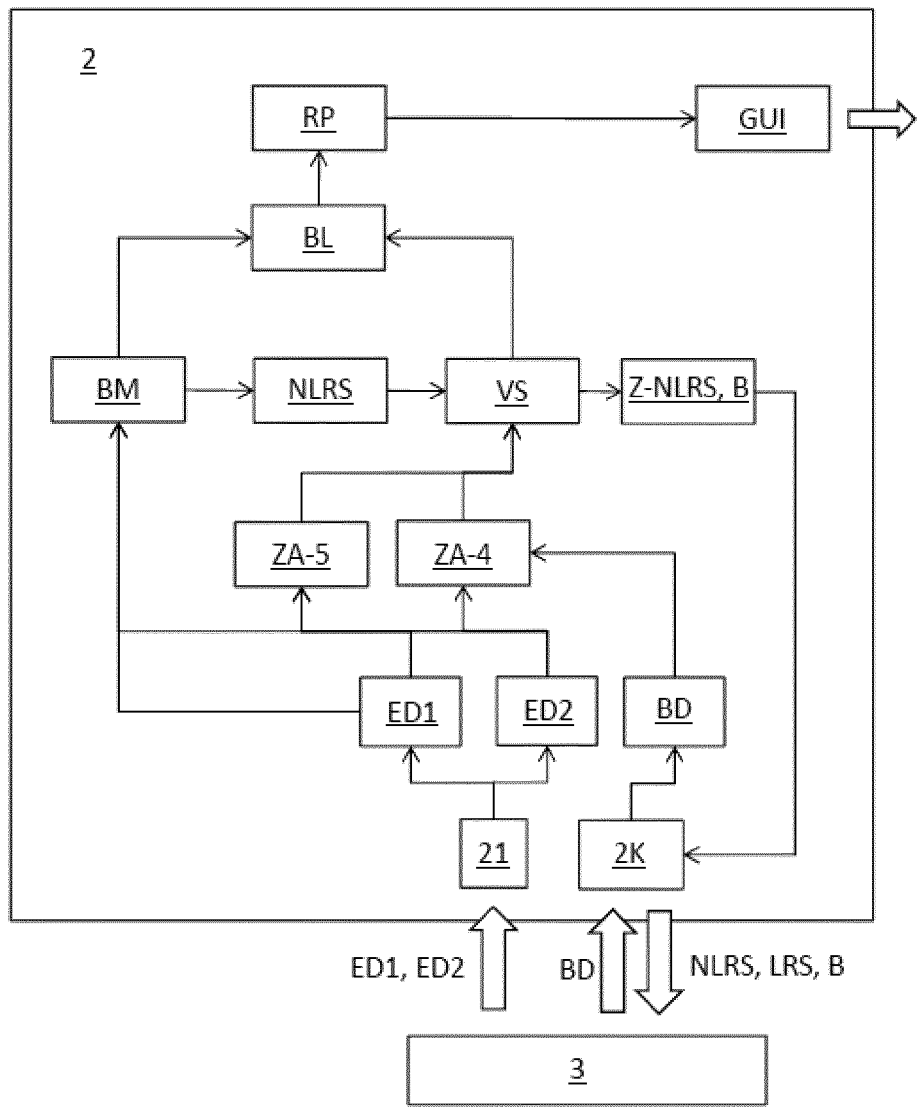
Figure 4:
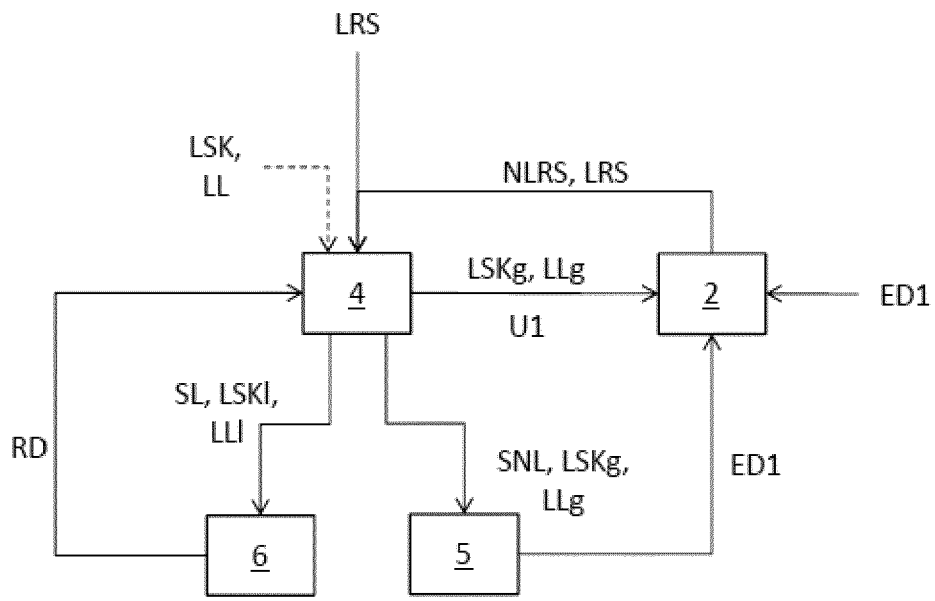
Figure 5:
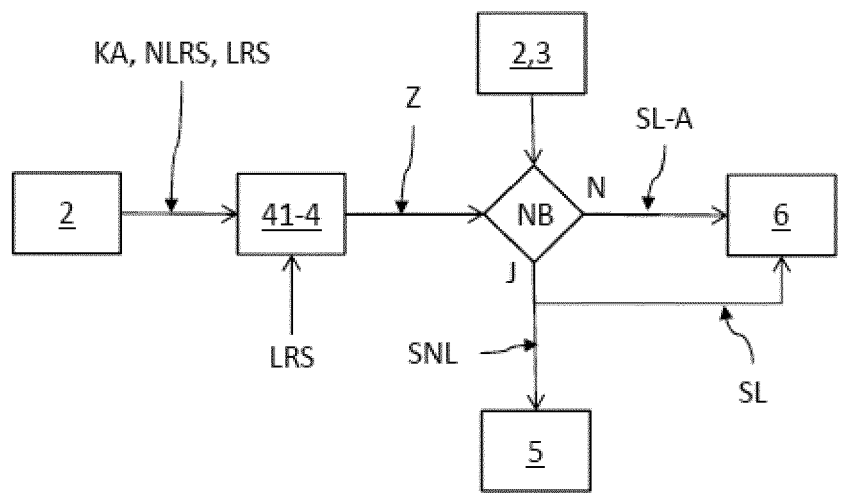
Figure 6:
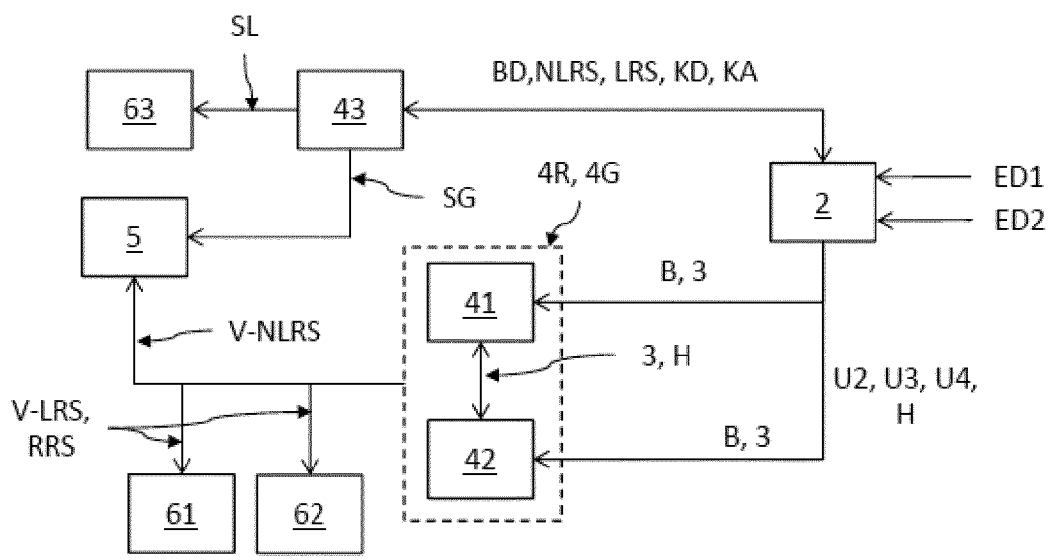
Figure 7:
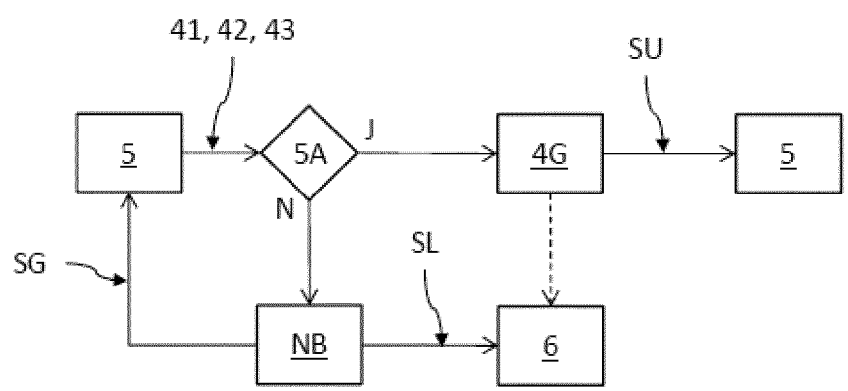
Figure 8:
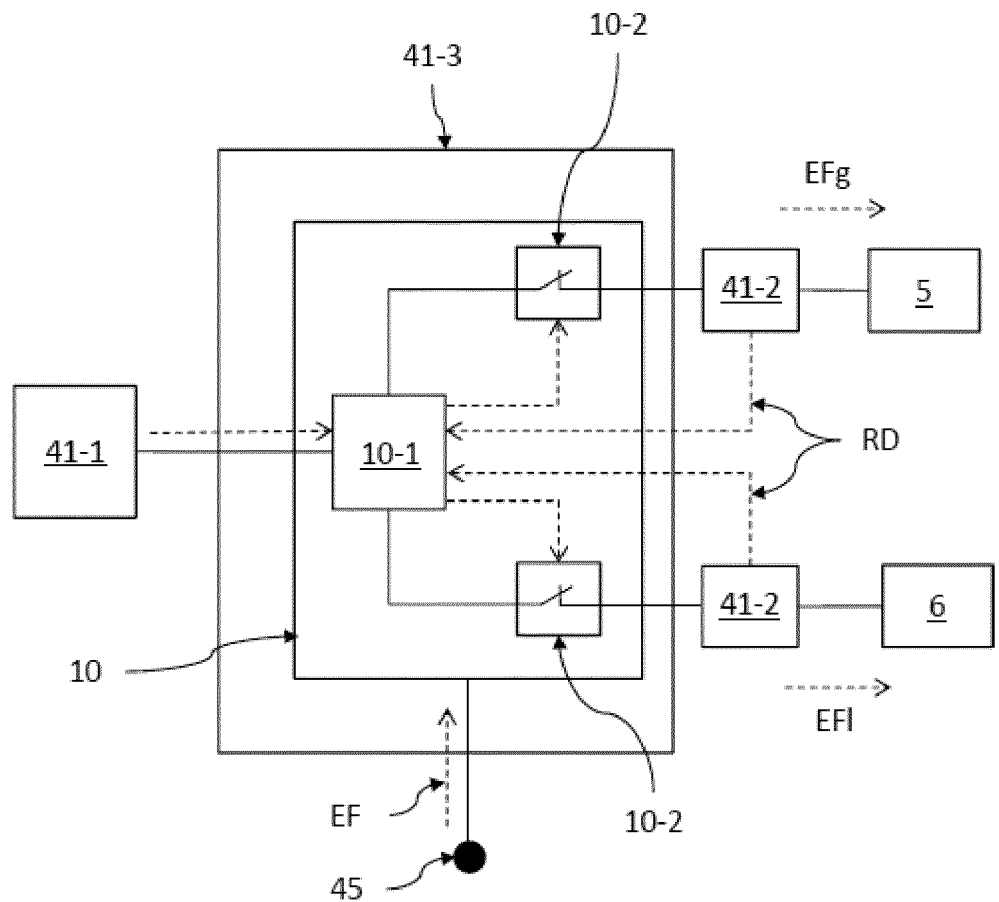

FIG. 1: an embodiment of the energy storage system according to the invention;

FIG. 2: an embodiment of a local energy storage facility in the energy storage system according to the invention;

FIG. 3: an embodiment of the central control unit in the energy storage system according to the invention;

FIG. 4: an embodiment of a procedure to operate the energy storage system according to the invention;

FIG. 5: an embodiment of the procedure according to the invention in case of impaired communication with the central control unit;

FIG. 6: an embodiment of a regulating network or regional network in the energy storage system according to the invention;

FIG. 7: an embodiment of the procedure according to the invention in case of failure of the non-local power supply grid;

FIG. 8: an embodiment of the control unit with a control box.

DETAILED DESCRIPTION OF THE EMBODIMENTS

FIG. 1 shows an embodiment of the energy storage system according to the invention 1. The energy storage system 1 here exemplarily comprises three local energy storage systems 41, 42, 43, which are placed in spatially (geographically) different positions (locations) P1, P2, P3 and each connected with a respective local storage capacity LSK and local output LL to absorbing En and/or emitting Ep energy to the power supply grid 5, 61, 62, 63, 64. In other embodiments, the energy storage system 1 may also comprise a much larger variety of local energy storage systems. In another embodiment, the energy storage system 1 may, however, also comprise only a single local energy storage system. In the embodiment shown, the three local energy storage facilities 41, 42, 43 are each connected to the non-local power supply grid 5 and one or more local power supply grids 61, 62, 63, 64. The local energy storage system 41 is connected to a local power supply grid 61 in parallel to the connection to the non-local power supply grid 5. The local energy storage system 42 is only connected to the local power supply grid 62, which is part of the non-local power supply grid 5, however, and in so far connected to the non-local power supply grid 5. The non-local power supply grid 5 thus can be either connected directly (separate connection) to the energy storage system 41, 43 or as in the energy storage system 42 indirectly via the local power supply grid 62. The energy storage system 42 thus also can perform the localized regulating and system tasks LRS in the local power supply grid 62 and the non-localized regulating and system tasks NLRS via the local power supply grid 62 in the non-local power supply grid 5. The local energy storage system 43 in location P3 is separately connected to the non-local power supply grid 5 and to two separate local power supply grids 63 and 64. The three energy storage systems 41, 42, 43 each comprise at least one local control unit 41-1, 42-1, 43-1, which assumes at least the control of the respective energy storage systems 41, 42, 43 for localized regulating and system tasks LRS for the respective local power supply grids 61, 62, 63, 64. If in contrast the energy storage systems 41, 42, 43 are equipped with several energy accumulator modules, the respective energy storage systems 41, 42, 43 can also have one local control unit per module. The energy storage system 1 further comprises a communication network 3 which connects the respective local control units 41-1, 42-1, 43-1 to a central control unit 2 and possibly among each other. The central control unit 2 assumes at least the control SNL of absorbing En and emitting Ep energy of the respective local energy storage systems 41, 42, 43 to the non-local power supply grid 5 here. The assumption of control can take place directly via instructions to the local control units 41-1, 42-1, 43-1 for subsequent execution by them or indirectly via submission of the non-localized regulating and system tasks NLRS to the respective control units, 41-1, 42-1, 43-1, which then execute the non-localized regulating and system tasks NLRS together with the respective localized regulating and system tasks LRS according to the priorities set. The central control unit 2 may also assume the control SL of absorbing En and emitting Ep energy of the respective local energy storage systems 41, 42, 43 to the local power supply grids 61, 52, 53, 64. The assumption of control can be directly via instructions to the local control units 41-1, 42-1, 43-1 for subsequent execution by them or indirectly via submission of the localized regulating and system tasks LRS to the respective control unit, 41-1, 42-1, 43-1, which then executes the localized regulating and system tasks LRS according to the priorities set. The priorities can be either generally set for regular operation NB and stored in the local control units 41-1, 42-1, 43-1 or an intended storage in the respective energy storage systems 41, 42, 43. Alternatively, the localized regulating and system tasks can also be submitted by another source (dashed arrow, not presented in detail) via the communication network 3 to the local energy storage systems 41, 42, 43. For special conditions in the non-local power supply grid 5, these priorities may be changed or overridden by the central control unit 2 as well. In this embodiment, the central control unit 2 is equipped to dispose of all portions of local storage capacities of the three local energy storage systems 41, 42, 43 for non-localized regulating and system tasks NLRS in the non-local power supply grid 5 that are not needed by the respective local control units 41-1, 42-1, 43-1 for the localized regulating and system tasks LRS. These unrequired capacities (free non-local capacities) are submitted to the central control unit as operating data BD via the communication network 3 for the central control unit 2. The operating data BD can comprise not only the free non-local capacities but also other data such as e.g. facility condition or system condition of the connected power supply grids (6 or 5) or external measuring data. To meet the localized regulating and system tasks LRS, the local energy storage systems 41, 42, 43 receive relevant data RD from the respective connected local power supply grids 61, 62, 63, 64, based on which the local control units 41-1, 42-1, 43-1 perform control of the local energy storage system 41, 42, 43 for the localized regulating and system tasks LRS in these local power supply grids 61, 62, 63, 64. Relevant data from the non-local power supply grid 5 are measured as well, based on which the local control units 41-1, 42-1, 43-1 execute control SG of the local energy storage system 41, 42, 43 for the non-localized regulating and system tasks NLRS in the non-local power supply grid 5. Here, e.g. the line frequency could be submitted as relevant data RD from the non-local power supply grid 5 directly to the local control units 41-1, 42-1, 43-1, to be able to execute specified non-localized regulating and system tasks NLRS such as the provision of primary control output. If required, localized regulating and system tasks LRS are also scheduled individually or for a regional network from the central control unit and submitted to the local control units. For execution of the non-localized regulating and control tasks NLRS, the central control unit 2 receives external data ED1 through corresponding interfaces 21 from one or more external systems 7 for superordinate control of the energy storage system 1. The external data ED1 can be, e.g., from a superordinate control of a mains network from several non-local power supply grids as an external system 7 and contain general regulating tasks that are implemented by the energy storage system according to the invention 1 in the connected non-local power supply grid 5. The external system can collect, e.g., relevant data RD in the non-local power supply grid 5 for this. The central control unit 2 receives the external data ED1 via the interface 21 and automatically generates the corresponding non-localized regulating and system tasks NLRS for the local energy storage systems 41, 42, 43 in the energy storage system 1 in reaction to receipt via an operating model stored in the central control unit 2. The central control unit 2 is also intended for submitting non-localized regulating and system tasks NLRS or additional or changed priority localized regulating and system tasks V-LRS to the local energy storage systems 41, 42, 43 in this embodiment based on local or regional influence data ED2, such as local environmental data like wind speed, solar radiation, sunshine duration and temperature, submitted e.g. from an environmental data measuring system 8. The influence data ED2 can be submitted through the communication network 3 or directly (dashed arrow) to the central control unit 2. These non-localized regulating and system tasks NLRS, which are based on the influence data ED2, are also automatically generated according to the above procedure in reaction to the receipt of the influence data ED2 via the interface 21 with the corresponding operating model. The local control units 41-1, 42-1, 43-1 are preferentially designed for giving the localized regulating and system tasks LRS for control of the respective energy storage system 41, 42, 43 precedence over the non-localized regulating and system tasks NLRS in the non-local power supply grid 5.

FIG. 2 shows an embodiment for a local energy storage system 41 in the energy storage system according to the invention 1. The general situation in the energy storage system 1 has already been described for FIG. 1. The local energy storage system 41 comprises three Energy storage modules 44, each of which comprises a kinematic energy storage with two flywheel energy accumulators 9 to absorb En energy from the connected power supply grids 5, 61 and to emit Ep energy to the connected power supply grids 5, 61 in this embodiment. The embodiment shown here is an example. The number of energy storage modules 44 per local energy storage system 41 depends on the respective desired application and thus may vary strongly between different energy storage systems 41, 42, 43. Energy storage systems 41, 42, 43 with only a single energy storage module 44 may be used as well. The number of energy accumulator units 9 (e.g. flywheel energy accumulators 9) per module is scalable as well. The energy storage module or modules 44 are connected via a shared connection point 45, so that their total storage capacity LKS and output LL can be used to control the connected power supply grids 5, 61. The individual energy storage modules 44 are controlled together by the local control unit 41-1 in this embodiment. The control is established by the local control unit 41-1 commanding the individual modules and/or the individual flywheel energy accumulators 9, how much energy is to be emitted from the flywheels by deceleration or absorbed into the flywheels by acceleration. For this energy absorption or emission to be performed as desired, the local control unit 41-1 controls the drive motors of the flywheel energy accumulators 9 to decelerate or accelerate the individual flywheel energy accumulators 9. The number of flywheel energy accumulators 9 in an energy storage module 44 may also differ from module to module and energy storage system to energy storage system. It is beneficial to have a high number of flywheel energy accumulators 9 per energy storage module 44, to increase the local storage capacity LKS of the energy storage system 41, 42, 43. The local energy storage system 41 comprises one or more measuring units 41-2 to measure one or more relevant data RD in the connected local power supply grid 61 and/or in the non-local power supply grid 5. Due to the relevant data RD measured in this manner and thus available in the local energy accumulator unit 41, the local control unit 41-1 may perform control of the local energy storage system 41 for the localized regulating and system tasks LRS in this local power supply grid 61 in a targeted and flexible manner for control of the mains quality after evaluation of the relevant data RD and comparison to the intended localized and non-localized regulating and system tasks LRS, NLRS and also execute the non-localized regulating and system tasks NLRS in the non-local power supply grid 5 such as the provision of regulating output in a targeted and flexible manner as well. The local energy storage system 41 is connected to the local power supply grid 61 and the non-local power supply grid 5 via a control unit 41-3, with the control unit 41-3 providing for the energy flow between the connected power supply grids 5, 61 and the energy storage system 41 so that the regulating and system tasks RS (e.g. non-localized and/or localized regulating and system tasks) to be performed by local control unit 41-1 and the subsequently intended energy flows reach the non-local and local power supply grids 5, 61 as instructed by the local control unit 41-1. The control unit 41-3 is also intended to disconnect one or more of the connected power supply grids 5, 61 form the local energy storage system 41 if necessary, e.g. at power failure. For execution of localized and non-localized regulating and system tasks LRS, NLRS, the local energy storage system 41 comprises a task storage 41-4, which stores the non-localized regulating and system tasks NLRS and/or localized regulating and system tasks LRS submitted by the central control unit 2. The localized regulating and system tasks LRS can also be submitted by other sources of the energy storage system 41, which are saved accordingly in the task storage 41-4. The localized and non-localized regulating or system tasks LRS, NLRS, may be configured and/or updated KA by the central control unit 2 in the task storage 41-4. For this, the central control unit 2 is connected to the communication network 3 via an interface 2K and the communication network 3 then to the task storage 41-4 of the energy storage system 41 via an interface 4K. The submission of the configuration or updating takes place in the form of submitted configuration data KD for the respective facility functions. The configuration or updating KA of the localized and non-localized regulating and system tasks LRS, NLRS in the task storage 41-4 may take place, e.g., based on external data ED1 or influence data ED2, which the central control unit 2 has received through the interface 21 indirectly via the communication network 3 or directly from external system 7 or measuring system 8 and stored in a storage 22 for analysis and determination of the localized and non-localized regulating and system tasks LRS, NLRS based on this. The local control unit 41-1 accesses Z the task storage 41-4 for control of the local energy storage 41, e.g. at periodic intervals (e.g. in the scope of milliseconds) or automatically after each configuration or updating KA by the central control unit 2 as reaction to the configuration or updating KA. The communication network 3 comprises of three sub-communication networks 31, 32, 33 in this embodiment, e.g. designed as wire-bound, radio and power-connected sub-communication networks 31, 32, 33. The local control unit 41-1 or the central control unit 2 check the present connection via the communication network to each other periodically with a digital handshake HS, in which the one side sends a data package, which is answered accordingly characteristically after being received by the other side. After receipt of the answer, the sending side has positively reviewed the presence of the communication connection. The digital handshake HS can be either initiated (sent) by the local control unit 41-1 or the central control unit 2 or the two control units 2, 41-1. The digital handshake HS is accordingly performed between other present local energy storage systems as well or between their local control units and the central control unit. The local control unit 41-1 and the central control unit 2 are designed to restore an interrupted connection along one of the sub-communication networks 31, 32, 33 via an alternative sub-communication network 31, 32, 33 in the communication network 3.

FIG. 3 shows an embodiment for a central control unit 2 in the energy storage system according to the invention. Connected to the communication network 3 through the interfaces 21, 2K, operating data BD such as the free non-local capacity LSKg and free non-local output LLg of the individual energy storage systems 41, 42, 43, external data ED1 and influence data ED2 are received. The operating data are stored and evaluated in a condition recording module ZA-4 for the local energy storage systems 41, 42, 43, e.g. according to the entire free non-local capacities LSKg and free non-local outputs LLg of all local energy storage systems 41, 42, 43 available for non-localized regulating and system tasks NLRS. At the same time, the temporal and local demand in regulating and system tasks for the non-local power supply grid 5 from the external data ED1 and influence data ED2 are determined by condition recording module ZA-5, which are also saved in the condition recording module ZA-5. Due to the determined regulating demand, the actually required regulating and system tasks RS (together designating the localized and non-localized regulating and system tasks LRS, NLRS) are generated via the operating model BM, which specifies the respective control parameters and control procedures as an overall plan and distributed in the distribution module VS across the respective local energy storage systems 41, 42, 43 according to the condition recording in the condition recording module ZA-4. The assignment module Z-NLRS then generates the non-localized regulating and system tasks NLRS individually for the individual local energy storage systems 41, 42, 43 as data packages to be transmitted in reaction to the task distribution and submits these individual regulating and system tasks via the interface 2K and the communication network 3 to the respective local energy storage system 41, 42, 43 for configuration or updating KA of the respective task storage 41-4. The central control unit 2 is also designed to evaluate the performed regulations from the operating model BM and the distribution control in the distribution control module VS and to present these regulations in the form of a report that is generated in the reporting module RP from the data available in the central control unit 2, on a graphic user interface GUI for the operators of the energy storage systems 2 and to have the report printed by them if required. The above modules may be hardware or software modules. These modules comprise e.g. individual computer programs for execution of the functions assigned to the modules, which are stored and executed, e.g., in the modules or together on a server for access by the modules. Alternatively, the modules can be stored as software modules directly on a server.

FIG. 4 shows an embodiment of a procedure to operate the energy storage system according to the invention, which may comprise several local energy storage systems 4 with the respective local storage capacities LSK and local outputs LL. For reasons of a better overview, the procedure is described here as example of a local energy storage system 4, with the procedure shown here accordingly also being possible for a variety of local energy storage systems 41, 42, 43 (not shown in detail here). The energy storage system 4 is suitable for absorbing En and emitting Ep energy from/to connected power supply grids 5, 6. The local energy storage system 4 with a local storage capacity LSK and a local output LL receives localized regulating and system tasks LRS, which utilize a part LSKI of the local storage capacity LSK and a part LLI of the local output LL. Without non-localized regulating and system tasks, the local energy storage system 41 would be controlled by the local control unit 41-1 regarding emission or absorbing of energy to/from the connected local power supply grid 6 SL according to the localized regulating and system tasks LRS, which would be adjusted SL based on relevant data RD from the local power supply grid 6 accordingly on demand. Such adjustment would be, e.g., the increased infeed of energy Ep into the local power supply grid 6 at dropping of the line frequency in the local power supply grid 6. The local energy storage system 41 submits U1 the free non-local capacities LSKg and free non-local output LLg not required for the localized regulating and system tasks LRS to the central control unit 2, which then submits the non-localized regulating and system tasks NLRS to the local energy storage system 4, e.g. based on external data ED1. The local energy storage system 41 then controls SNL the absorption En and emission Ep of energy in an also-connected non-local power supply grid 5 according to the submitted non-localized regulating and system tasks NLRS in the scope of the free non-local storage capacities LSKg and free non-local output LLg not required for the localized regulating and system tasks LRS. The local power supply grid 6 in contrast is primarily supplied in the scope of the local required capacities LSKl and local required outputs LLl to increase the quality of a local power supply grid (SL).

FIG. 5 shows an embodiment for the procedure according to the invention in case of impaired communication with the central control unit 2. At a present communication connection via the communication network 3, the central control unit 2 has submitted localized and non-localized regulating and system tasks LRS, NLRS to the task storage 41-1 and thus updated KA it. This task storage 41-4 also already contains localized regulating and system tasks LRS for this energy storage system 41. If the local control unit 41-1 now accesses Z the task storage 41-4, it is also reviewed whether the energy storage system 1 works in regular operation NB, which includes review of the communication connection with the central control unit 2. If the result of the review that there is a communication connection is positive ("Y"), e.g. due to a completed digital handshake HS, the energy storage system 41 will primarily execute SL the localized regulating and system tasks LRS for the local power supply grid 6 and, in the scope of the free non-local capacities LSKg, also perform SNL the non-localized regulating and system tasks. If the review of the communication connection is negative ("N"), only the localized regulating and system tasks LRS for the local power supply grid 6 are performed SL-A.I A periodic review of the communication connection can cause the review to be positive ("Y") again at a later point, so that the local energy storage system 41 will once again perform the non-localized regulating and system tasks NLRS in the scope of the available capacities and outputs LSK, LL, LSKg, LLg, LSKl, LLl in parallel.

FIG. 6 shows an embodiment of a regulating network 4G or regional network 4R in the energy storage system 1 according to the invention. The central control unit 2 receives external data ED1 from a superordinate control and determines B according to this external data ED1, here e.g. two local energy storage systems 41, 42, that are to perform priority non-localized regulating or system tasks V-NLRS in the non-local power supply grid 5 preferentially as compared to the further local energy storage systems 43. These two local energy storage systems 41, 42 thus form a regulating network 4G (shown with dashed line) for the non-local power supply grid 5. The central control unit 2 is also intended to form a regional network 4R (also shown with dashed line) of the specific B energy storage systems based on local or regional influence data ED2, here also shown at the example of the local energy storage systems 41, 42. In the regional network 4R, the central control unit 2 can also provide the specific B energy storage systems 41, 42 with additional or changed priority localized regulating and system tasks V-LRS as regional regulating and system tasks RRS for execution in the local power supply grid 61, 62 connected U2 to the regional network 4R. In the embodiment shown here, the control units 41-1, 42-1 of the energy storage systems 41, 42 of the regulating networks 4G and/or the regional network 4R directly communicate with each other via the communication network 3 for execution of the priorities of non-localized regulating or system tasks V-NLRS and/or regional regulating and system tasks RRS without inclusion of the central control unit 2. Additionally, the central control unit 2 can at least temporarily transfer the task of control SNL, SL of the regulating network 4G and/or the regional network 4R at a pre-determined B local control unit 41-1 in the regulating network 4G and/or in the regional network 4R U3. Additionally, the central control unit 2 can submit U4 a hierarchy H of the local control units 41, 42 in the regulating network 4G and/or in the regional network 4R together with or separately from the transfer U3 of the task of control. Based on the hierarchy H, the local control unit 42-1 following in the hierarchy H can take over control of the regulating network 4G and/or regional network 4R at failure of the control unit 41-1 charged with control or the corresponding local energy storage system 41. These transfers can be reported by the assuming local control unit 42-1 to the other local control units of the regulating network 4G or the regional network 4R (not displayed here) automatically as a reaction to the completed transfer or determination of the failure of the previously leading local control unit 41-1.

FIG. 7 shows an embodiment for the procedure according to the invention in the case of failure of the non-local power supply grid. In this embodiment, a regulating network 4G was determined B previously by the central control unit 2, and is ready for black start support SU if the non-local power supply grid 5 fails 5A. The energy storage systems 41, 42, 43 continually check, e.g. via the corresponding measuring units (also see FIG. 8) and the control units 41-3, 42-3, 43-3 that the non-local power supply grid 5 is present. If the review shows that the non-local power supply grid 5 is present (5A=N), the local energy storage systems 41, 42, 43 will continue to operate in regular operation NB, so that the local energy storage systems 41, 42, 43 are controlled SL, SNL according to the regulating and system tasks RS. If the review shows that the non-local power supply grid 5 has failed (5A=Y), the black start support SU for the non-local power supply grid 5 is given precedence over the localized regulating and system tasks LRS (shown by the dashed arrow to the local power supply grid 6). The local energy storage systems 41, 42, 43 in the regulating network 4G will perform a black start for the non-local power supply grid 5 after or with the corresponding synchronization of the infeed frequency together. Once the black start has been successfully performed, the localized regulating and system tasks LRS are performed with precedence.

FIG. 8 shows an embodiment of the control unit 41-3, which is connected to a local power supply grid 6 and a non-local power supply grid 5 in this embodiment. For the control unit 41-3 to control the energy flow between the connected power supply grids 5, 6 and the energy storage system 41 and disconnect one or more of the connected power supply grids, here the local power supply grid 6 and/or the non-local power supply grid, from the local energy storage system 41, 42, 43 on demand, the control unit 41-3 in this embodiment comprises a regulating box 10 with a regulating element 10-1 and separate disconnection switches 10-2 for each of the connected power supply grids 5, 6. The local control unit 41-1 is connected to the regulating element 10-1 of the regulating box 10 via a data connection and submits the corresponding configuration data of the regulation function KD-R to the regulating box 10, here directly to the regulating element 10-1, for control of the energy flows. Due to the configuration data of the regulating function KD-R, the regulating element 10-1 controls distribution of the energy flow EF incoming from the connection point 45 to the connected power supply grids 5, 6 as energy flow EFl for the local power supply grid 6 and energy flow EFg for the non-local power supply grid 5. In this embodiment, only an example of the distribution of the energy flows at infeed of energy into both connected power supply grids 5, 6 is shown. The regulating box 10 is equally designed to control an energy flow from one of the connected power supply grids 5, 6 and an energy flow to the other connected power supply grids 6, 5; depending on size of the two energy flows, either the negative energy surplus is saved by the energy storage system 41 or the positive energy surplus is provided by the energy storage system 41. The energy storage system 41 is not shown explicitly here, but only symbolically shown via the corresponding components 41-1, 41-2, 41-3. The regulating box 10 simultaneously receives the relevant data RD from the two connected power supply grids 5, 6 from the corresponding measuring units 41-2, upon which the regulating element 10-1 derives the presence of the two connected power supply grids 5, 6 by criteria or thresholds filed in the regulating element 10-1 for the relevant data RD. If one or both connected power supply grids 5, 6 are no longer available due to a power failure, the failure of the respective power supply grids 5, 6 manifests in the corresponding relevant data RD submitted to the regulating element 10-1, upon which the regulating element 10-1 automatically sends the corresponding separating instructions (dashed arrow) to the respective disconnection switch or switches 10-2 to disconnect the energy storage system 41 from the one or more connected power supply grids 5, 6, upon which the disconnection switch or switches 10-2 disconnect the previously connected one or more power supply grids 5, 6 from the energy storage system 41. The disconnection of the connected power supply grid takes place within a few milliseconds. At disconnection of only one power supply grid, the energy storage system 41 remains in operation for the other still connected power supply grids. This can effectively prevent a short circuit or overload situation in case of power supply grid failure. The embodiment shown here with a connected local power supply grid 6 and a connected non-local power supply grid 5 is only one example of two connected power supply grid. The control unit 41-3, especially the regulating box 10, may be connected to more than two power supply grids as well in other embodiments. The two or more connected power supply grids may also each be local power supply grids of which at least one of the local power supply grids is connected to the non-local power supply grid for execution of the non-localized regulating and system tasks.

The embodiments shown here are only examples of this invention and therefore must not be considered limiting. Alternative embodiments considered by the specialist are equally included in the protection of the present invention.

LIST OF REFERENCE SIGNS 1 energy storage system according to the invention
2 central control unit
21 interface(s) of the central control unit for external data and/or influence data
22 data storage of the central control unit
2K interface(s) of the central control unit to the communication network
3 communication network
31 wire-bound sub-communication network
32 radio-bound sub-communication network
33 power-bound sub-communication network
4, 41, 42, 43 local energy storage system
41-1, 42-1, 43-1 local control unit of the local energy storage system
41-2, 42-2, 43-2 measuring unit of the local energy storage system
41-3, 42-3, 43-3 control unit for connection of the local energy storage system to the power supply grids
41-4, 42-4, 43-4 task storage of the local energy storage system
44 energy storage modules
45 connection point of the energy storage modules
4G regulating network for the non-local power supply grid from several local energy storage systems for a special purpose (e.g. black start)
4R regional network from several local energy storage systems
4K interface(s) of the local energy storage systems to the communication network
5 non-local power supply grid
5A failure of the non-local power supply grid
6, 61, 62, 63, 64 local power supply grid
7 external system (superordinate control)
8 measuring system to determine influence data
9 energy accumulator unit, e.g. a flywheel energy accumulator
10 regulating box
10-1 regulating element
10-2 disconnection switches
B determination of individual or a number of local energy storage systems for a regulating network, a regional network or for black start support
BD operating data of the local energy storage system
BL balancing module
BM operating model
ED1 external data
ED2 influence data
EF energy flow
EFnl energy flow in/from the non-local power supply grid
EFl energy flow in/from the local power supply grid
En absorbing energy from the power supply grid by the energy storage system (provision of negative energy)
Ep emitting energy into the power supply grid by the energy storage system (provision of positive energy)
NLRS non-localized regulating and control tasks
GUI graphical user interface
H hierarchy of the control in the regulating network or in the regional network
HS review of the presence of the communication connection
KA configuration or updating of the task storages
KD configuration data of the facility function
KD-R configuration data of the regulating function in regulating box
LL local output of the local energy storage system
LLg free non-local output for NLRS
LLl local output needed for localized regulating and system tasks
LRS localized regulating and system tasks
LSK local storage capacity of the local energy storage system
LSKg local storage capacity available for the non-localized regulating and system tasks (free non-local capacity)
LSKl local storage capacity intended for the localized regulating and system tasks
NB regular operation P1, P2, P3 geographical (spatial) position of the energy storage system
RD relevant data of the local power supply grid
RP reporting module
RS regulating and system tasks, e.g. LRS and/or NLRS
RRS regional regulating and system tasks
SNL control of the respective local energy storage system for non-localized regulating and system tasks
SL control of the respective local energy storage system for localized regulating and system tasks
SL-A exclusive control of the respective local energy storage system for localized regulating and system tasks
SU black start support
U1 submission of the capacities not required for the localized regulating and system tasks to the central control unit
U2 submission of local or regional regulating tasks to specific energy storage systems in the regional network
U3 transfer of the task of control of the regulating network and/or the regional network to a specific local control unit
U4 submission of a hierarchy of the local control units in the regulating network and/or in the regional network to the respective local control units
V-LRS priority localized regulating and system tasks for a regional network of specific local energy storage systems
VS distribution control module for distribution of the non-localized regulating and system tasks to the respective local energy storage systems
Z access of the local control unit to the task storage
ZA-4 condition recording module for the local energy storage systems
ZA-5 condition recording module for the non-local power supply grid
Z-NLRS assignment module for assignment of non-local regulating and system tasks to the energy storage systems

The invention claimed is:

1. An energy storage system, comprising one or more local energy storage systems with a respective local storage capacity and local output suitable for absorbing and emitting energy from and to connected power supply grid, with the one or more local energy storage systems each being connected to a non-local power supply grid and/or one or more local power supply grids, but at least comprising one local control unit to control the respective energy storage system for localized regulating and system tasks for the one or more respective local power supply grids and the energy storage system further comprising a central control unit connected via a communication network to the respective local control unit to control absorbing and emission of energy from the one or more local energy storage systems to the non-local power supply grid, with the central control unit being equipped for disposing of all portions of the local storage capacities and of the local output of the one or more energy storage systems for non-localized regulating and system tasks in the non-local power supply grid that have been submitted by the respective local control units to the central control unit via the communication network as not needed for the localized regulating and system tasks, wherein the central control unit receives operating data from the local control units via the communication network and submits at least non-localized regulating and system tasks based on the submitted operating data of the local energy storage system or systems for emission of energy to the non-local power supply grid and/or to absorb energy from the non-local power supply grid via the communication network.

2. The energy storage system according to claim 1, characterized in that the local energy storage system comprises one or more flywheel energy accumulators to absorb energy from the connected power supply grids and to emit energy to the connected power supply grids.

3. The energy storage system according to claim 1, characterized in that the local energy storage system comprises one or more measuring units to measure one or more relevant data in the respective connected power supply grid and the control unit to execute control of the local energy storage system for the respective connected power supply grid based on the measured relevant data.

4. The energy storage system according to claim 1, characterized in that the local energy storage system comprises a control unit to which the one or more local power supply grids and the non-local power supply grid are connected, with the control unit designed to control an energy flow between the connected power supply grids and the energy storage system.

5. The energy storage system according to claim 4, characterized in that the control unit further to disconnect one or more of the connected power supply grids from the local energy storage system on demand.

6. The energy storage system according to claim 1, characterized in that the local energy storage system comprises a task storage for storage of the localized and non-localized regulating and system tasks that is configured and/or updated by the central control unit at least regarding the non-localized regulating or system tasks in the non-local power supply grid and which the local control unit accesses for control of the local energy storage according to the non-localized and localized regulating or system tasks.

7. The energy storage system according to claim 6, characterized in that the local control unit is designed to give the localized regulating and system tasks for control of the respective energy storage system precedence over the non-localized regulating and system tasks.

8. The energy storage system according to claim 1, characterized in that the local energy storage system exclusively executes the localized regulating and system tasks for the one or more respective local power supply grids in the task storage at failure of the communication network and/or of the central control unit.

9. An energy storage system comprising one or more local energy storage systems with a respective local storage capacity and local output suitable for absorbing and emitting energy from and to connected power supply grid, with the one or more local energy storage systems each being connected to a non-local power supply grid and/or one or more local power supply grids, but at least comprising one local control unit to control the respective energy storage system for localized regulating and system tasks for the one or more respective local power supply grids and the energy storage system further comprising a central control unit connected via a communication network to the respective local control unit to control absorbing and emission of energy from the one or more local energy storage systems to the non-local power supply grid, with the central control unit being equipped for disposing of all portions of the local storage capacities and of the local output of the one or more energy storage systems for non-localized regulating and system tasks in the non-local power supply grid that have been submitted by the respective local control units to the central control unit via the communication network as not needed for the localized regulating and system tasks, wherein the central control unit further to determine which of the local energy storage systems are ready for black start support and that black start support takes precedence over the localized regulating and system tasks for the one or more respective connected local power supply grids.

10. The energy storage system according to claim 9 characterized in that the local energy storage system comprises one or more flywheel energy accumulators to absorb energy from the connected power supply grids and to emit energy to the connected power supply grids.

11. The energy storage system according to claim 9 characterized in that the local energy storage system comprises one or more measuring units to measure one or more relevant data in the respective connected power supply grid and that the control unit further to execute control of the local energy storage system for the respective connected power supply grid based on the measured relevant data.

12. The energy storage system according to claim 9 characterized in that the local energy storage system comprises a control unit to which the one or more local power supply grids and the non-local power supply grid are connected, with the control unit designed to control an energy flow between the connected power supply grids and the energy storage system.

13. The energy storage system comprising one or more local energy storage systems with a respective local storage capacity and local output suitable for absorbing and emitting energy from and to connected power supply grid, with the one or more local energy storage systems each being connected to a non-local power supply grid and/or one or more local power supply grids, but at least comprising one local control unit to control of the respective energy storage system for localized regulating and system tasks for the one or more respective local power supply grids and the energy storage system further comprising a central control unit connected via a communication network to the respective local control unit to control absorbing and emission of energy from the one or more local energy storage systems to the non-local power supply grid, with the central control unit being equipped for disposing of all portions of the local storage capacities and of the local output of the one or more energy storage systems for non-localized regulating and system tasks in the non-local power supply grid that have been submitted by the respective local control units to the central control unit via the communication network as not needed for the localized regulating and system tasks, wherein the central control unit comprises one or more interfaces for external systems for receipt of external data for superordinate control of the energy storage system and to determine individual or a number of local energy storage systems for non-localized regulating or system tasks in the non-local power supply grid over other local energy storage systems and form a regulating network for the non-local power supply grid based on these external data.

14. The energy storage system according to claim 13, characterized in that the control units of the energy storage systems of the regulating network and/or the regional network are designed to communicate with each other directly via the communication network for execution of the non-localized regulating or system tasks and/or regional regulating and system tasks without inclusion of the central control unit.

15. The energy storage system according to claim 14, characterized in that the central control unit at least temporarily assigns the task of control of the regulating network and/or the regional network to a local control unit in the regulating network and/or in the regional network determined by the central control unit.

16. The energy storage system according to claim 14, characterized in that the central control unit submits a hierarchy of the local control units in the regulating network and/or in the regional network together with the transfer of the control task, with the local control unit following in the hierarchy to control the regulating network and/or the regional network at failure of the control unit charged with control or the corresponding local energy storage system.

17. The energy storage system according to claim 13 characterized in that the local energy storage system comprises one or more flywheel energy accumulators to absorb energy from the connected power supply grids and to emit energy to the connected power supply grids.

18. The energy storage system according to claim 13 characterized in that the local energy storage system comprises one or more measuring units to measure one or more relevant data in the respective connected power supply grid and that the control unit further to execute control of the local energy storage system for the respective connected power supply grid based on the measured relevant data.

19. The energy storage system according to claim 13 characterized in that the local energy storage system comprises a control unit to which the one or more local power supply grids and the non-local power supply grid are connected, with the control unit designed to control an energy flow between the connected power supply grids and the energy storage system.

20. An energy storage system comprising one or more local energy storage systems with a respective local storage capacity and local output suitable for absorbing and emitting energy from and to connected power supply grid, with the one or more local energy storage systems each being connected to a non-local power supply grid and/or one or more local power supply grids, but at least comprising one local control unit to control of the respective energy storage system for localized regulating and system tasks for the one or more respective local power supply grids and the energy storage system further comprising a central control unit connected via a communication network to the respective local control unit to control absorbing and emission of energy from the one or more local energy storage systems to the non-local power supply grid, with the central control unit being equipped for disposing of all portions of the local storage capacities and of the local output of the one or more energy storage systems for non-localized regulating and system tasks in the non-local power supply grid that have been submitted by the respective local control units to the central control unit via the communication network as not needed for the localized regulating and system tasks, wherein the central control unit further to determine individual or a number of local energy storage systems which form a regional network from the specific energy storage systems based on local or non-local influence data and to submit to them additional or changed priority localized regulating and system tasks as regional regulating and system tasks.

21. The energy storage system according to claim 20 characterized in that the local energy storage system comprises one or more flywheel energy accumulators to absorb energy from the connected power supply grids and to emit energy to the connected power supply grids.

22. The energy storage system according to claim 20 characterized in that the local energy storage system comprises one or more measuring units to measure one or more relevant data in the respective connected power supply grid and that the control unit further to execute control of the local energy storage system for the respective connected power supply grid based on the measured relevant data.

23. The energy storage system according to claim 20 characterized in that the local energy storage system comprises a control unit to which the one or more local power supply grids and the non-local power supply grid are connected, with the control unit designed to control an energy flow between the connected power supply grids and the energy storage system.

24. An energy storage system comprising one or more local energy storage systems with a respective local storage capacity and local output suitable for absorbing and emitting energy from and to connected power supply grid, with the one or more local energy storage systems each being connected to a non-local power supply grid and/or one or more local power supply grids, but at least comprising one local control unit to control of the respective energy storage system for localized regulating and system tasks for the one or more respective local power supply grids and the energy storage system further comprising a central control unit connected via a communication network to the respective local control unit to control absorbing and emission of energy from the one or more local energy storage systems to the non-local power supply grid, with the central control unit being equipped for disposing of all portions of the local storage capacities and of the local output of the one or more energy storage systems for non-localized regulating and system tasks in the non-local power supply grid that have been submitted by the respective local control units to the central control unit via the communication network as not needed for the localized regulating and system tasks, wherein the local control unit is designed to periodically review the present connection with the central control unit via the communication network and the local control unit is designed to recover this connection in case of interruption of the connection with the central control unit via an alternative sub-communication network in the communication network.

25. The energy storage system according to claim 24 characterized in that the local energy storage system comprises one or more flywheel energy accumulators to absorb energy from the connected power supply grids and to emit energy to the connected power supply grids.

26. The energy storage system according to claim 24 characterized in that the local energy storage system comprises one or more measuring units to measure one or more relevant data in the respective connected power supply grid and that the control unit further to execute control of the local energy storage system for the respective connected power supply grid based on the measured relevant data.

27. The energy storage system according to claim 24 characterized in that the local energy storage system comprises a control unit to which the one or more local power supply grids and the non-local power supply grid are connected, with the control unit designed to control an energy flow between the connected power supply grids and the energy storage system.

28. A procedure for operation of an energy storage systems comprising one or more local energy storage systems with a respective local storage capacity and local output, which are suitable to absorb and emit energy from/to connected power supply grids, comprising:

Controlling of the respective local energy storage system for localized regulating and system tasks in one or more local power supply grids connected to the local energy storage system by a local control unit in the scope of the capacity and output of the energy storage system for the one or more local power supply grids, Submitting of the capacities and output not required for the localized regulating and system tasks of the local energy storage system by the local control unit via a connected communication network to a central control unit also connected to the communication network, and Controlling of the respective local energy storage system to absorb and emit energy for non-localized regulating and system tasks in a non-local power supply grid also directly or indirectly connected to the local energy storage system by central control unit via the communication network in the scope of the portions of all capacities and output of the energy storage system not required for the localized regulating and system tasks submitted to the central control unit.

29. The procedure according to claim 28, further compromising:

Configuring and/or updating of at least the non-local regulating or system tasks for the non-local power supply grid in one task storage of the local energy storage system, additionally comprising the localized regulating and system tasks, Accessing of the local control unit to the task storage for control of the local energy storage, Priority control controlling of the energy storage system for localized regulating and system tasks by the local control unit according to the task storage in the regular operation and Exclusive execution of the localized regulating and system tasks for the one or more respective local power supply grids at failure of the communication network and/or of the central control unit.

* * * * *